United States Patent
Zhu et al.

(10) Patent No.: US 9,424,033 B2
(45) Date of Patent: *Aug. 23, 2016

(54) MODIFIED BALANCED THROUGHPUT DATA-PATH ARCHITECTURE FOR SPECIAL CORRELATION APPLICATIONS

(71) Applicants: STMicroelectronics (Beijing) R&D Company Ltd., Beijing (CN); STMicroelectronics S.r.l., Agrate Brianza (IT)

(72) Inventors: PengFei Zhu, Bejing (CN); HongXia Sun, Bejing (CN); YongQiang Wu, Bejing (CN); Elio Guidetti, Montano Lucino (IT)

(73) Assignees: STMICROELECTRONICS (BEIJING) R&D COMPANY LTD., Beijing (CN); STMICROELECTRONICS S.R.L., Agrate Brianza (MB) (IT)

( * ) Notice: Subject to any disclaimer, the term of this patent is extended or adjusted under 35 U.S.C. 154(b) by 450 days.

This patent is subject to a terminal disclaimer.

(21) Appl. No.: 13/936,886

(22) Filed: Jul. 8, 2013

(65) Prior Publication Data

US 2014/0019727 A1 Jan. 16, 2014

(30) Foreign Application Priority Data

Jul. 11, 2012 (CN) .......................... 2012 1 0251241

(51) Int. Cl.
  *G06F 15/76* (2006.01)
  *G06F 13/00* (2006.01)
  (Continued)

(52) U.S. Cl.
  CPC .......... *G06F 9/3004* (2013.01); *G06F 9/30043* (2013.01); *G06F 9/30112* (2013.01); *G06F 9/30127* (2013.01); *G06F 9/345* (2013.01); *G06F 9/3824* (2013.01); *G06F 9/3893* (2013.01)

(58) Field of Classification Search
  CPC ................................ G06F 9/3004; G06T 1/20
  See application file for complete search history.

(56) References Cited

U.S. PATENT DOCUMENTS

| 6,502,182 | B1 | 12/2002 | Morishima | |
| 7,633,789 | B2 * | 12/2009 | Norman | G11C 5/02 365/148 |

(Continued)

FOREIGN PATENT DOCUMENTS

| CN | 1729464 A | 2/2006 |
| CN | 1900927 A | 1/2007 |

(Continued)

*Primary Examiner* — Hyun Nam
(74) *Attorney, Agent, or Firm* — Allen, Dyer, Doppelt, Milbrath & Gilchrist, P.A.

(57) ABSTRACT

Apparatus and method for a modified, balanced throughput data-path architecture is given for efficiently implementing the digital signal processing algorithms of filtering, convolution and correlation in computer hardware, in which both data and coefficient buffers can be implemented as sliding windows. This architecture uses a multiplexer and a data path branch from the Address Generator unit to the multiply-accumulate execution unit. By selecting between the data path of Address Generator to execution unit and the data path of register to execution unit, the unbalanced throughput and multiply-accumulate bubble cycles caused by misaligned addressing on coefficients can be overcome. The modified balanced throughput data-path architecture can achieve a high multiply-accumulate operation rate per cycle in implementing digital signal processing algorithms.

20 Claims, 10 Drawing Sheets

(51) Int. Cl.
*G06F 9/30* (2006.01)
*G06F 9/345* (2006.01)
*G06F 9/38* (2006.01)

(56) References Cited

U.S. PATENT DOCUMENTS

2004/0003201 A1 1/2004 Burns
2006/0271764 A1 11/2006 Nillson
2006/0271765 A1 11/2006 Tell
2014/0019679 A1* 1/2014 Zhu .................. G11C 19/00
                                                    711/109

FOREIGN PATENT DOCUMENTS

CN 101203846 A 6/2008
CN 101238455 A 8/2008

* cited by examiner

MODIFIED BALANCED THROUGHPUT DATA-PATH ARCHITECTURE FOR SPECIAL CORRELATION APPLICATIONS

RELATED APPLICATION INFORMATION

This application is a translation of and claims the priority benefit of Chinese patent application number 201210251241.4, filed on Jul. 11, 2012, entitled "Modified Balanced Throughput Data-Path Architecture For Special Correlation Applications", and is related to U.S. Pat. No. 9,082,476 issued Jul. 14, 2015, "Novel Data Accessing Method to Boost Performance of FIR Operation on Balanced Throughput Data-Path Architecture," which are hereby incorporated by reference in their entirety to the maximum extent allowable by law.

FIELD OF THE INVENTION

The invention described herein relates to system architectures, apparatuses and methods for implementing digital signal processing (DSP) operations. More specifically, but not exclusively, it deals with systems, apparatuses, and methods for implementing DSP operations that involve multiply-accumulate (MAC) calculations, such as finite impulse response (FIR) filtering, convolution, correlation, and others. Other fields of science also use MAC operations, for instance numerical simulations of physical sciences.

BACKGROUND OF THE INVENTION

In the field of signal processing, especially digital signal processing, many of the necessary operations are of the form of a finite impulse response (FIR) filter, also known as a weighted average. In this well-known operation, a finite set of values, also called filter coefficients or tap weights, $h(k)$, for $k=0, \ldots, N'11$, and the values of an input data sequence, $x(k)$, are used to create output sequence values, $y(n)$, by the rule $y(n)=\Sigma_{k=0}^{N-1} h(k)x(n-k)$. Because each time n is incremented by 1, the selected set of input values is shifted by 1, this process is also called a sliding window sum. To calculate each $y(n)$, pairs of coefficients and input values are first multiplied and then added to the sum, a process termed multiply-accumulate (MAC).

Other known types of calculation common in signal processing involve a correlation calculation, similar to FIR operations, but involving two data signals.

One example is the operation of autocorrelation, in which a signal $x(m)$ is compared with a shifted version of itself, $x(m+n)$, to create an autocorrelation signal by the formula $X(n)=\Sigma_{k=0}^{N-1} x(k)x(k+n)$. It is clear that such a correlation calculation also uses many MAC operations.

FIR and correlation operations are used extensively in signal processing to select data desired frequencies, remove noise, calculate a signal's power spectral density, among other applications. As the forms of the equations show, these operations are well-suited for implementation on computer hardware. To implement FIR filter operations, the filter coefficients are loaded into a dedicated memory array, then for each value $y(n)$, the corresponding portion of the inputs are loaded into a second memory array, and the MAC operation is performed pairwise on the aligned values. To implement an autocorrelation, values of both signals are continually loaded into memory.

Though implementing FIR and correlation operations can be done on a general purpose computer process through software, and often is, many signal processing applications require very fast computations of the operations. These cases often require dedicated implementation on special purpose digital hardware, such as digital signal processors (DSP), on reconfigurable platforms such as field programmable gate arrays (FPGA), or on application specific integrated circuits (ASIC). At this level, the specific details of hardware implementation, such as how the values are represented and internally stored, their data type, data bus sizes, etc., become important for obtaining very high speed operations. One goal for efficient hardware implementation is to have a MAC operation occur on every cycle. Achieving even higher MAC rates is especially worthwhile.

A general method and system, known in the art, for achieving fast FIR operations is shown in FIG. 1. Data or coefficients are moved from the system's memory through an address generator (AG) and stored in the system's quickly accessible memory locations, called the register file (Reg File). On each cycle, two values are moved from the Reg File into the MAC unit and their product calculated and summed into the accumulated value and written back to the accumulation register location.

For normal ongoing operation there must be a balance of the amount of data being read into the Reg File as is consumed by the MAC unit. Further, data values going into the MAC unit must be complete; if there is a delay accessing a data value necessary for the MAC unit, then it must wait a cycle (or more) until it obtains a complete data value for the multiply and accumulate calculation. Such a pause is called a bubble cycle. It represents an inefficiency in the overall operation of the system. Preventing such inefficiency is one overall goal of the present invention. Another goal is to create an architecture in which more than one MAC operation can be performed in one cycle. Another goal is to handle address misalignments for performing correlation type calculations.

SUMMARY OF THE INVENTION

A known, prior art, balanced throughput architecture is shown in FIG. 1. However, it has limitations in that bubble cycles may occur often enough to reduce overall efficiency.

One solution for address misalignment is shown if FIG. 2, in which the Address Generator produces two system memory addresses, which uses two ports for read and write operations. FIG. 3 shows another architecture to solve address misalignment without using the AG architecture of FIG. 2. Instead, the architecture of FIG. 3 uses the AG architecture of FIG. 4. The architecture of FIG. 3 is suited for avoiding bubble cycles during implementations of FIR operations.

The architecture of this invention is shown in FIG. 7, and is adapted for avoiding memory misalignment problems when implementing correlation operations.

Data, e.g. comprising values of a sampled signal, is stored in the system's large memory storage, which is often random access memory, and is herein called system memory. As various values from system memory are needed for FIR or correlation calculations, the AG moves the values from system memory into the architecture's register memory file system, comprising memory which is quickly accessible to the MAC execution unit.

One embodiment of the current invention uses a hierarchical structure for the register memory file system. This element, called the Grouped Register File (GRF) system, organizes the registers into three levels. The first level is the base level of individual register locations. The second level organizes the registers into pairs of registers. The third level organizes the paired registers into grouped registers, each group comprising two paired registers, and thus four individual registers.

The GRF system's hierarchy and referencing scheme is used by embodiments of the invention in the next feature, the misaligned address placement (MAP) system. The MAP is implemented by the AG, and loads values from system memory into the registers, by two specific processes detailed below, in order to completely fill each single grouped register.

Further, its specific loading order helps the overall system implement one MAC, or more, per cycle.

A third feature of embodiments of the invention is to use a dedicated data path from the AG directly to the MAC execution unit, so that the AG can move data directly from system memory into the MAC execution unit. This feature can eliminate the need for bubble cycles during correlation operations, since misaligned data can be immediately loaded into the MAC unit at the same time that data is being loaded into registers. The correct loading of the values into the MAC execution unit (EX) is accomplished by a multiplexer (MUX).

The fourth feature of the invention is the use of parallel processing in the MAC execution unit. Since the operation to be performed on multiple pairs of data is multiply-accumulate, it is advantageous for the MAC to be structured to receive many pairs of data and coefficients and to perform the operations simultaneously on each cycle. The term used for this form of processing is single-instruction, multiple data (SIMD). The MAC execution unit, regardless of the amount of parallelism it employs, after the multiply-accumulate process, writes back to the register memory system the value of the MAC operation(s).

As will be detailed below, the combination of these features of the invention allows the system throughput—to and from registers and memory—to stay in balance. Further, bubble cycles due to misalignment can be overcome. Finally, higher MAC rates can be achieved.

The foregoing and other features, utilities and advantages of the invention will be apparent from the following more particular description of an embodiment of the invention as illustrated in the accompanying drawings.

BRIEF DESCRIPTION OF THE DRAWINGS

The detailed description references the accompanying figures. In the figures, the digit(s) to the left of the two right-most digits of a reference number identifies the figure in which that reference number first appears. The same numbers are used throughout the drawings to reference like features and components.

DETAILED DESCRIPTION

As a convenience, commonly used acronyms are listed here:
AG Address Generator
ASIC Application Specific Integrated Circuit
DSP Digital Signal Processor (or Processing)
EX Execution Unit
FIR Finite Impulse Response
FPGA Field Programmable Gate Array
GR Group Register
MAC Multiply-accumulate
MAP Misplaced Address System
PR Paired Register
RAM Random Access Memory
SIMD Single Instruction, Multiple Data
MUX Multiplexer It is well known that many operations of digital signal processing, in particular, FIR filters or correlation operations, use a sliding window type of operation, in which an output set of values is created from an input set by shifted sums of pairwise multiplications of input values by coefficients, or tap weights. For example, a FIR filter has the form $y(n)=\Sigma_{k=0}^{N-1} h(k)x(n-k)$, and a convolution of signals $X(n)$ and $Y(n)$ is $X*Y[n]=\Sigma_k X(n-k) Y(k)$. For applications that demand fast calculation of such formulas, it is clear that the operation of multiply and accumulate must be performed rapidly, preferably in parallel. The invention herein discloses various embodiments for the fast implementation of such MAC operations. As used herein, the term data value will refer either to a signal data value or a filter coefficient data value.

Figure 1:
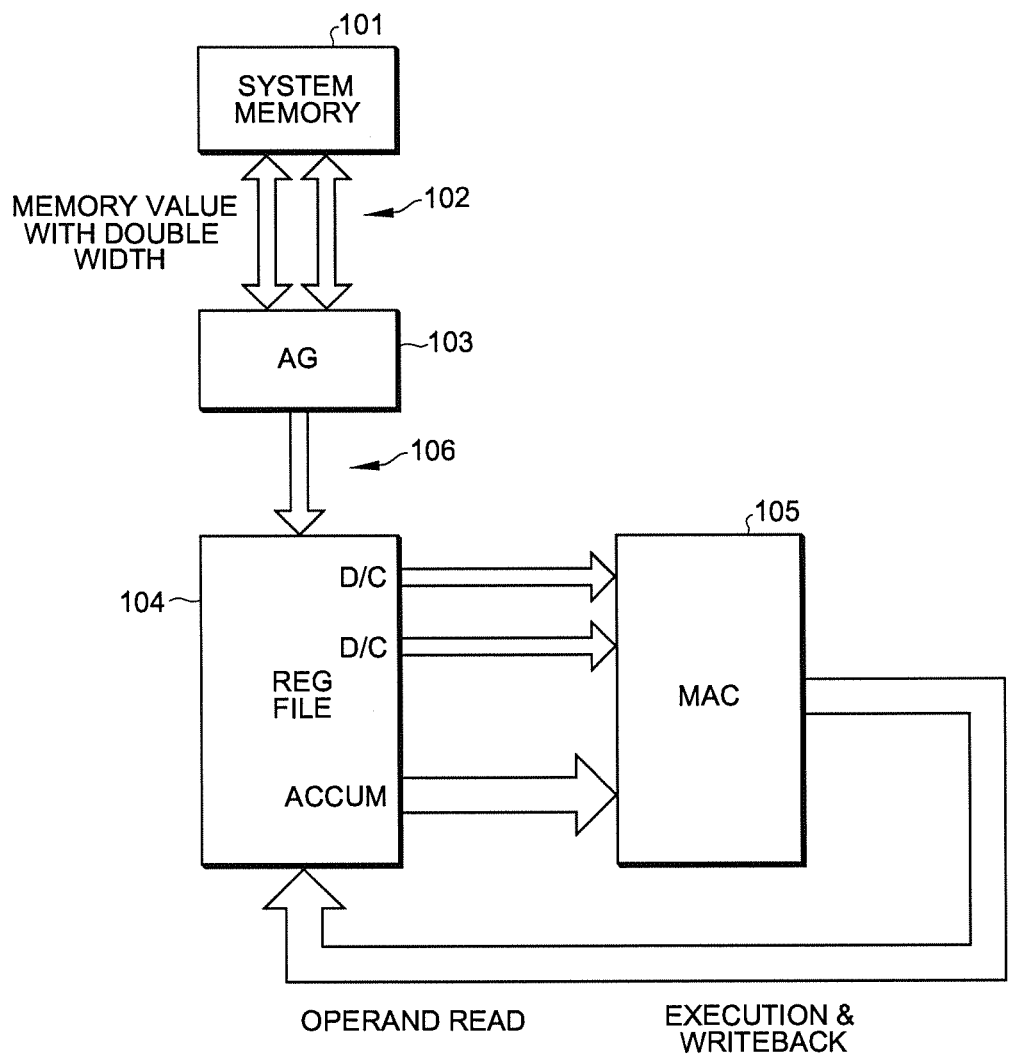
FIG. 1 shows a prior art balanced throughput data path and accessing architecture.

One known architecture for implementing FIR filtering in digital circuitry is shown in FIG. 1, and called a balanced throughput data-path architecture. It can be implemented on special purpose DSP chips, FPGAs, or ASICs. It comprises four principle elements: a large system memory 101, an address generator AG 103, a Reg File 104, and a MAC execution unit 105. The system memory is often comprised of random access memory, and is used to store large amounts of the input and output data values, and if necessary the filter coefficients for a FIR application. The Reg File unit comprises an array of memory locations called registers which are typically faster for the processing parts of the system to access. The AG is the addressing system, often implemented in circuitry, responsible for moving desired pieces of the data between the system memory and the register file. The AG receives and writes values to the system memory over the data bus 102. Finally, the MAC unit 105 comprises the necessary circuitry for multiplying two values and adding that product to an accumulation value. The accumulation value, Accum, may be larger in byte size than the size of the data or coefficients D/C while stored in the Reg File, in order to prevent problems of arithmetic overflow. As is known in the art, MAC units now have the capability of executing a MAC operation in one cycle.

Under ideal operating conditions in which the goal is to obtain one MAC operation to occur in each cycle, the system must move the same amount of data from the system memory into the Reg File as it moves from the Reg File into the MAC, and back to the accumulation register location. This is the balancing of data throughput that is needed to prevent overflow of the Reg File, and to ensure the MAC execution unit is fully utilized.

In this known architecture, the Reg File may have a three-read/two-write port structure, so that on each cycle two data and/or coefficient values, D/C in FIG. 1, together with the current value of the of the accumulation, is moved from the Reg File into the MAC unit for a MAC operation. Simultaneously, two new data or coefficient values are moved by the AG from the system memory over one write port 106 into the Reg File, and at the end of the MAC operation, the updated accumulation value is moved by the MAC execution unit back into the Reg File location where it originated over the other write port of the Reg File.

For this architecture to work ideally, the two new data or coefficient values that are to be accessed from system memory must be moved in one cycle from system memory. Further, the data memory addresses used by the AG must align with the memory blocks of the memory, so that two data values can be moved in one cycle over the data bus.

However, if the memory address of a complete pair of coefficients and/or data values is not aligned with the blocks of the system memory, i.e. the address points to a byte between boundaries of an access block of system memory, then in one cycle only part of the needed pair can be moved over the bus, and the system would need to wait for the next cycle to complete the data move. This is called memory misalignment; it requires a bubble cycle in the MAC unit so that the complete pair of values can be moved into the Reg File locations.

Figure 2:
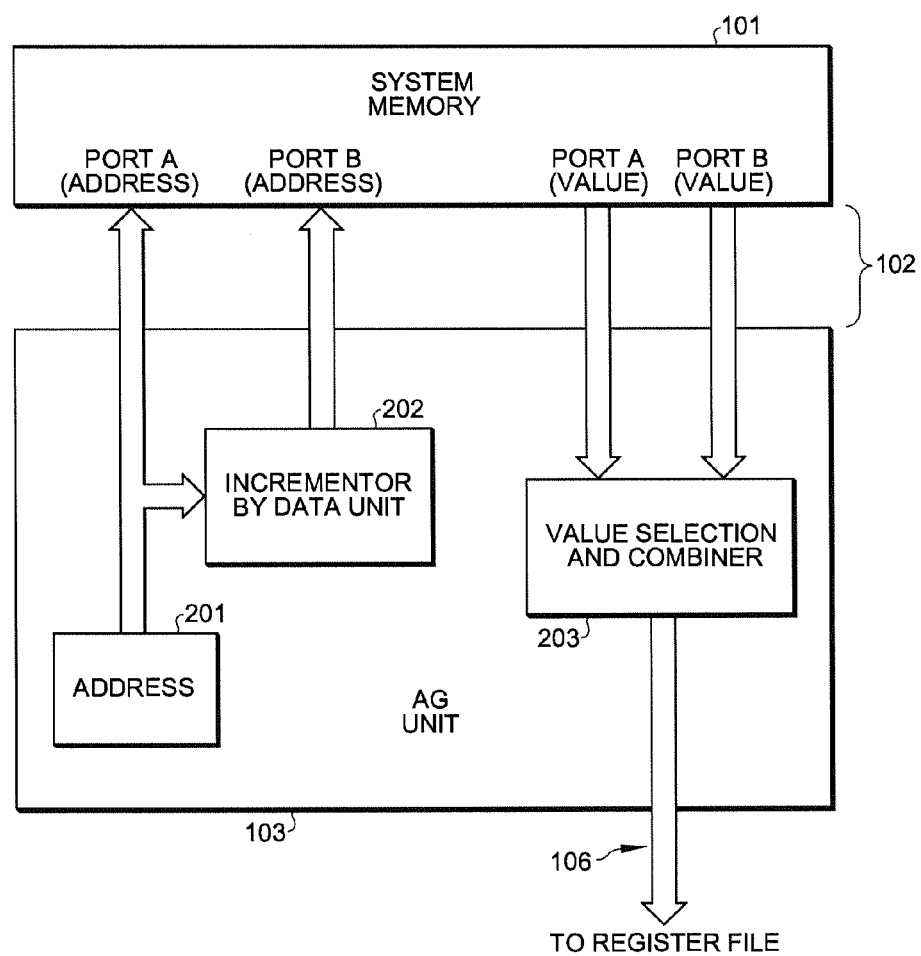
FIG. 2 shows the internal structure and data accessing paths of the address generator unit.

One known way to handle memory misalignment is to double the AG, and to have the system memory have both dual address ports and dual value output ports. This is shown in FIG. 2. In the case that data and/or coefficient values are stored across a memory block boundary, then to access it, the AG will need to generate two addresses, the start 201, and the incremented address generated by an Incrementor unit 202. But this would require two address ports be available on the system memory. Also, the system memory would need two ports by which to export memory blocks containing the values. Within the AG, the selector and combiner unit 203 would assemble the data value and move it to the Reg File. While functional, this approach requires more circuit area and power for implementation in digital hardware.

Figure 3:
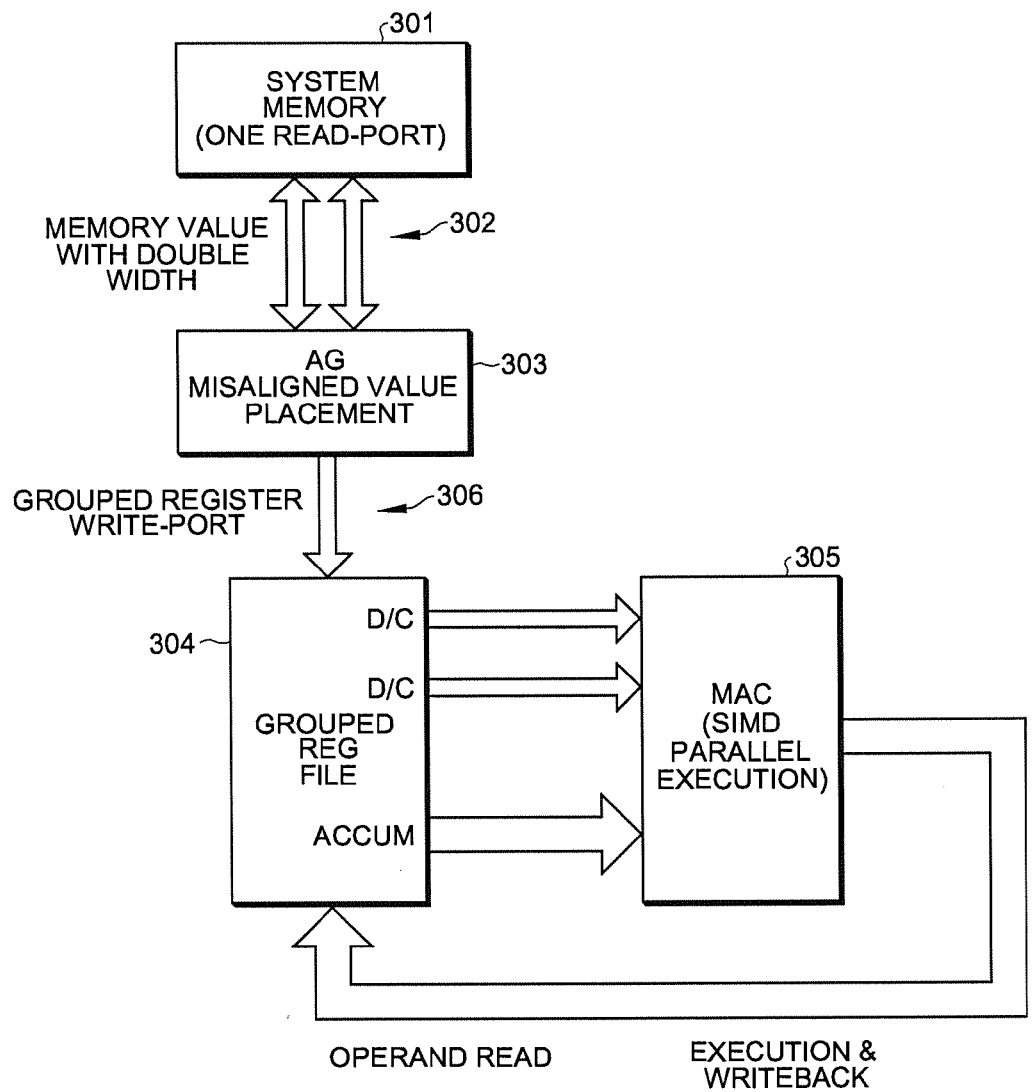
FIG. 3 shows one solution for the misaligned address problem.
Figure 4:
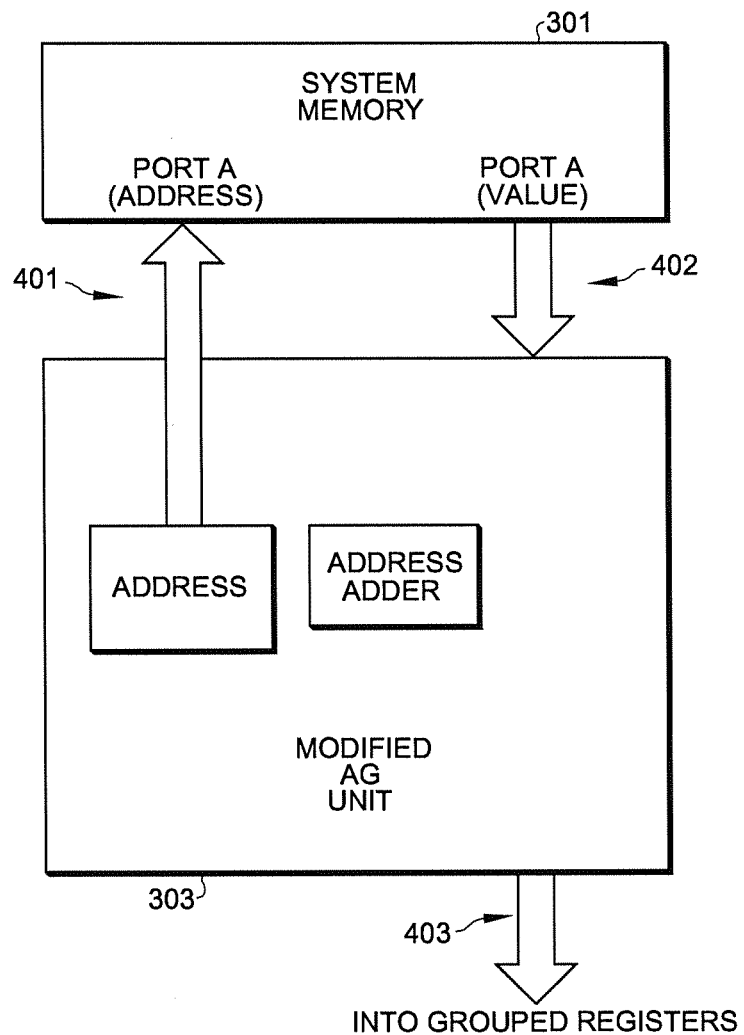
FIG. 4 shows a modified address generator, used by the architecture shown in FIG. 3.

A different architecture for achieving balanced data throughput, which can reduce or eliminate the occurrence of bubble cycles, and which can be extended to achieve more than one MAC in a clock cycle is shown in FIG. 3.

Figure 5:
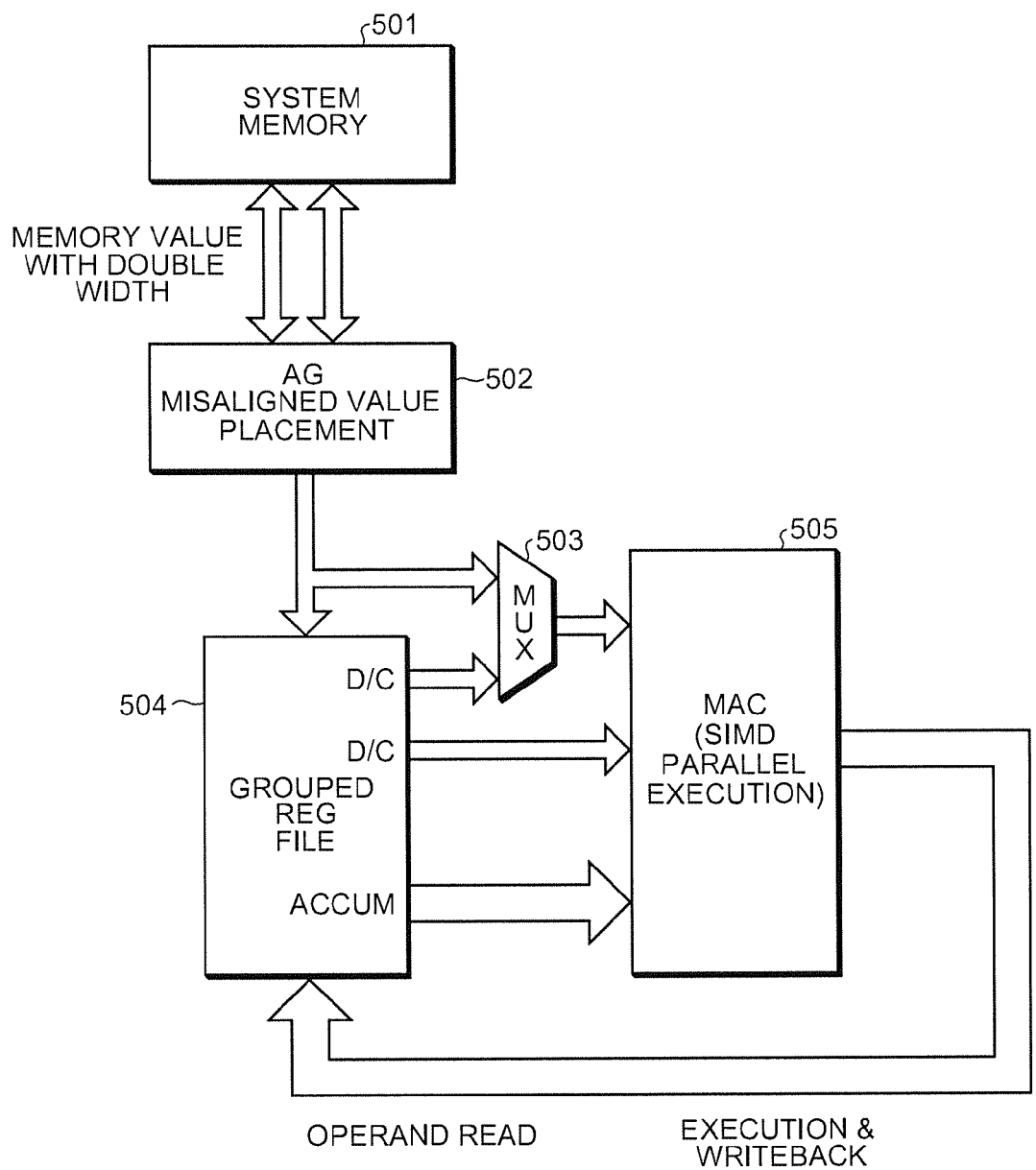
FIG. 5 shows the architecture of the current invention.

The current invention modifies that new architecture to handle address misalignment for correlation type calculations in which two signals' data values are being loaded into registers. For consistency of referencing, the architecture of FIG. 3 is termed the unmodified architecture, and the architecture herein disclosed, shown in FIG. 5, is termed the modified architecture.

The embodiments of the current invention, as well as of the unmodified architecture, comprise a main memory system, typically comprised of RAM, which is accessed by an address generator AG to move values, either signal values or coefficients, to and from a memory system, called a GRF, which is directly accessed and written to by a multiply-accumulate processor (MAC).

Figure 6:
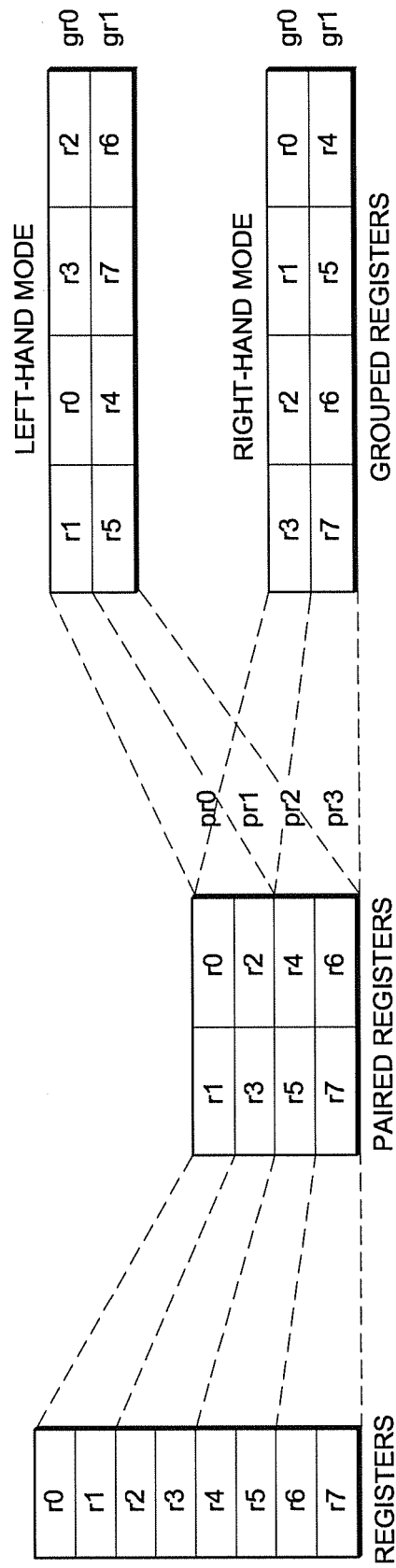
FIG. 6 shows how registers are organized using the GRF system.

The preferred embodiment of the modified architecture register uses a hierarchical organization scheme for the individual register memory locations. In the preferred embodiment this is a three-layer data addressing and accessing scheme, comprising the base layer of the individual registers, a second layer in which pairs of individual register memory locations are combined for use as a unit, called a paired register (PR), and in which two PRs are combined for use as a unit, called a grouped register (GR). FIG. 6 shows, from left to right, an example in which eight registers have individual addresses, labeled schematically as r0 through r7, how contiguous pairs of these registers are combined into four PRs, labeled schematically p0 through p3, and finally how—by alternate modes—these four PRs are grouped into two Group Registers (GR), labeled schematically g0 and g1. The embodiment illustrated shows that the PRs have the odd indexed registers to the left, with the even indexed registers to the right.

There are two modes of organization of the PRs into GRs. In the left-hand mode, the even indexed PR is placed to the left, with the odd indexed PR to the right. In the right-hand mode the odd indexed PR is placed to the left with the even indexed PR to the right.

With this hierarchical register organization scheme, the AG can move values to and from the memory system to allow an increase in the number of MAC operations performed in a cycle, which can overcome the need for a bubble cycle when there is a misalignment of memory address, and which can maintain balance in the operation pipeline.

Figure 7:
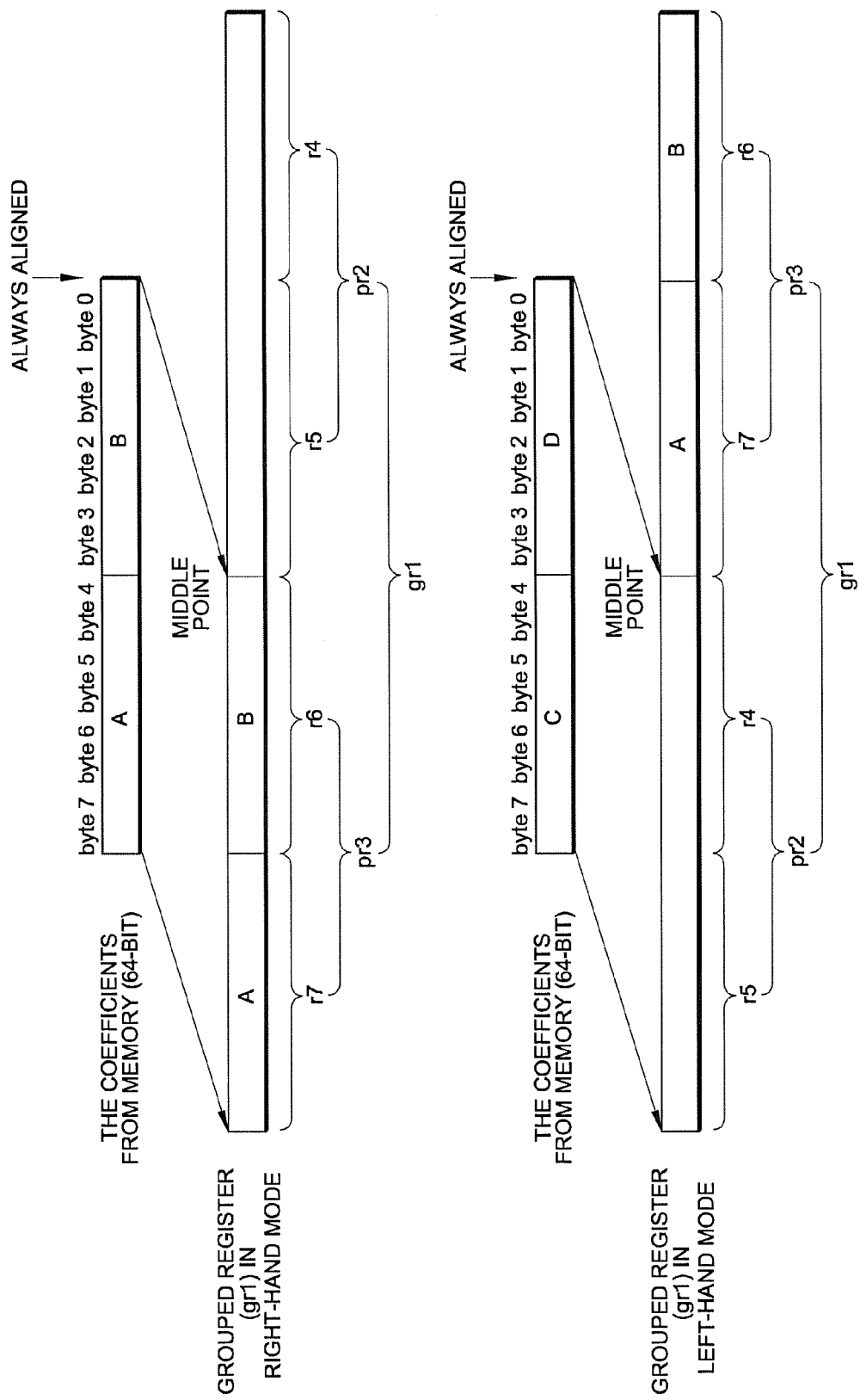
FIG. 7 shows the alignment for data loading from memory using a GRF system, when there is no address misalignment.

As an exemplary case of the operation of the AG with the GRF system, assume that register width is 32 bits, i.e. 4 Bytes. Also assume that the AG accesses a double width (64 bits, i.e. 8 bytes) data block from memory, as shown in FIG. 3. If no memory misalignment is detected, the values from memory can be stored in one PR, of one GR. A second data block from memory could then be stored in the other PR of the GR. This is illustrated in FIG. 7.

Figure 8:
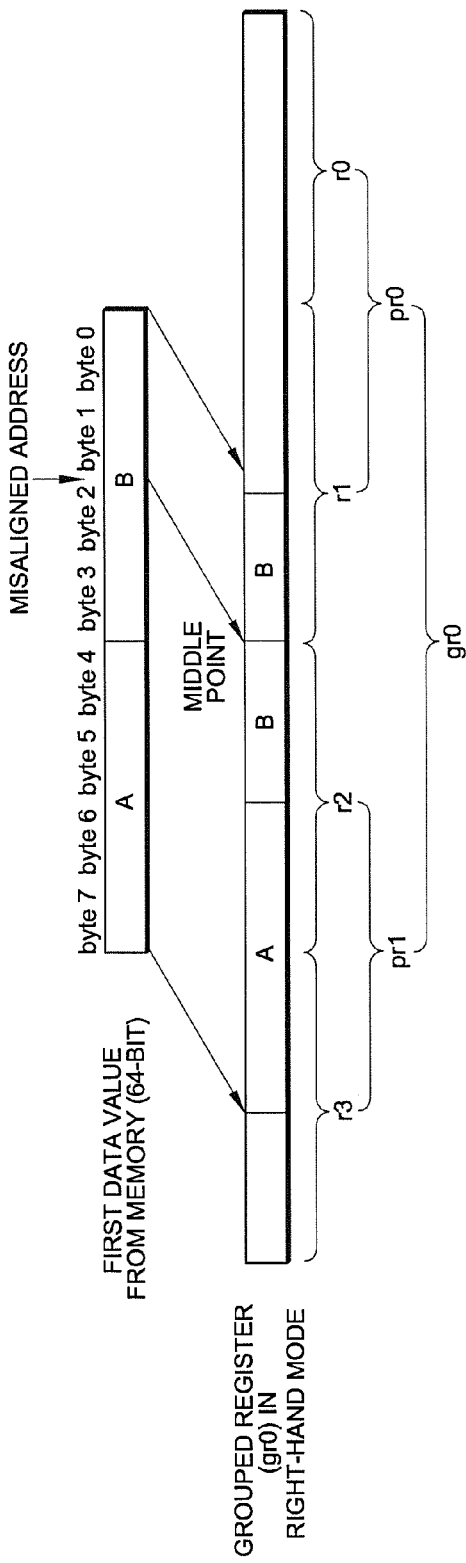
FIG. 8 shows the alignment for data loading from memory using a GRF system, in the case that there is address misalignment.

But if a memory address misalignment is detected, then an embodiment of the invention loads the 8 byte block of data to be moved into the registers by first having the AG assign an alignment point based on the address's misalignment pattern. As an example, if the address's misalignment is at byte 7 (of 0 to 7), the alignment point is the point between byte 7 and byte 6. This point is aligned with the midpoint of the target group register, so that bytes 0 through 6 are schematically aligned to the right of the GR's midpoint, and byte 7 is schematically aligned to the left of the midpoint, as shown in FIG. 8. Then the data bytes are loaded into the target GR as shown. Note only one of the four available bytes in register r6 is filled, and that one byte of register r4 is unfilled. Note that in FIG. 6 the GR, labeled g1, uses the right-hand mode of the GRF system for the first loading of data.

Figure 9:
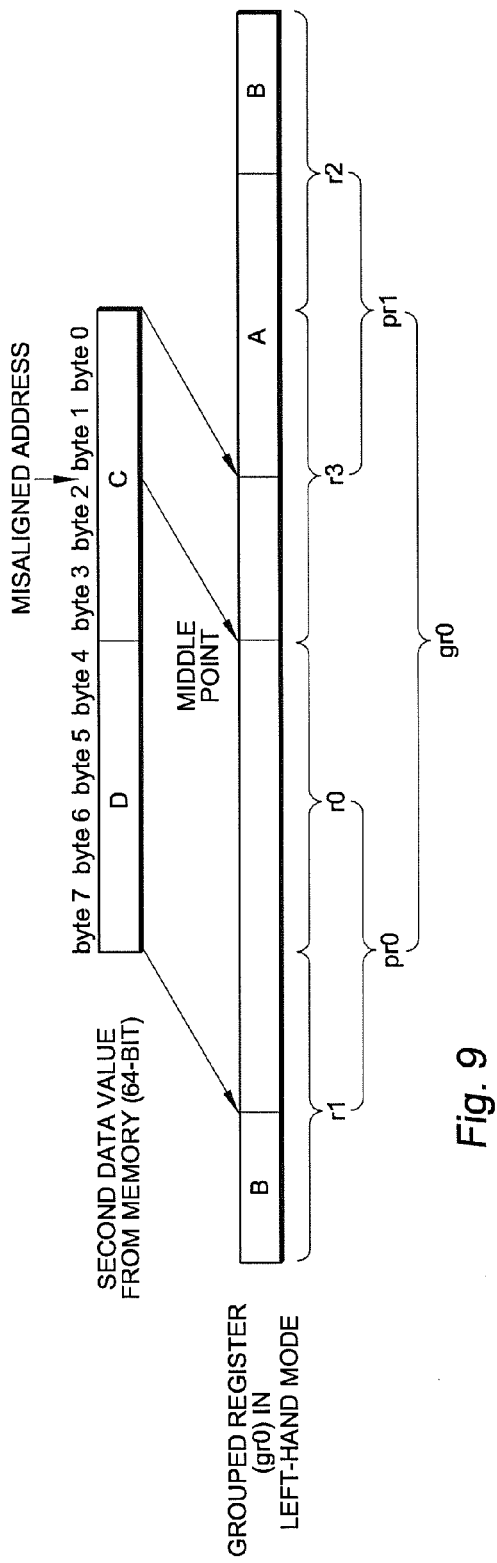
FIG. 9 shows the alignment for a second data loading from memory using a GRF system, in the case that there is address misalignment.

For a continuous loading operation, if the exemplary right-hand mode loading operation of the previous paragraph has been used for one loading operation, then on the next iteration, the next block of 8 bytes loaded uses a left-hand mode, with the same GR. FIG. 9 shows how use of the left-hand mode of accessing the registers in gr1 allows the next 8 bytes, C and D, to be loaded into the remaining sections of gr0.

When signal data has been loaded into one gr1, and further signal data is to be loaded into another, it is possible that a memory misalignment can delay moving data from the registers into the MAC. The embodiment of the modified architecture for balanced data throughput is shown in FIG. 8. Note that unlike the unmodified architecture, in this embodiment there is now a multiplexer capable of bypassing loading data in registers, and immediately loading the data values directly into the MAC.

Figure 10:
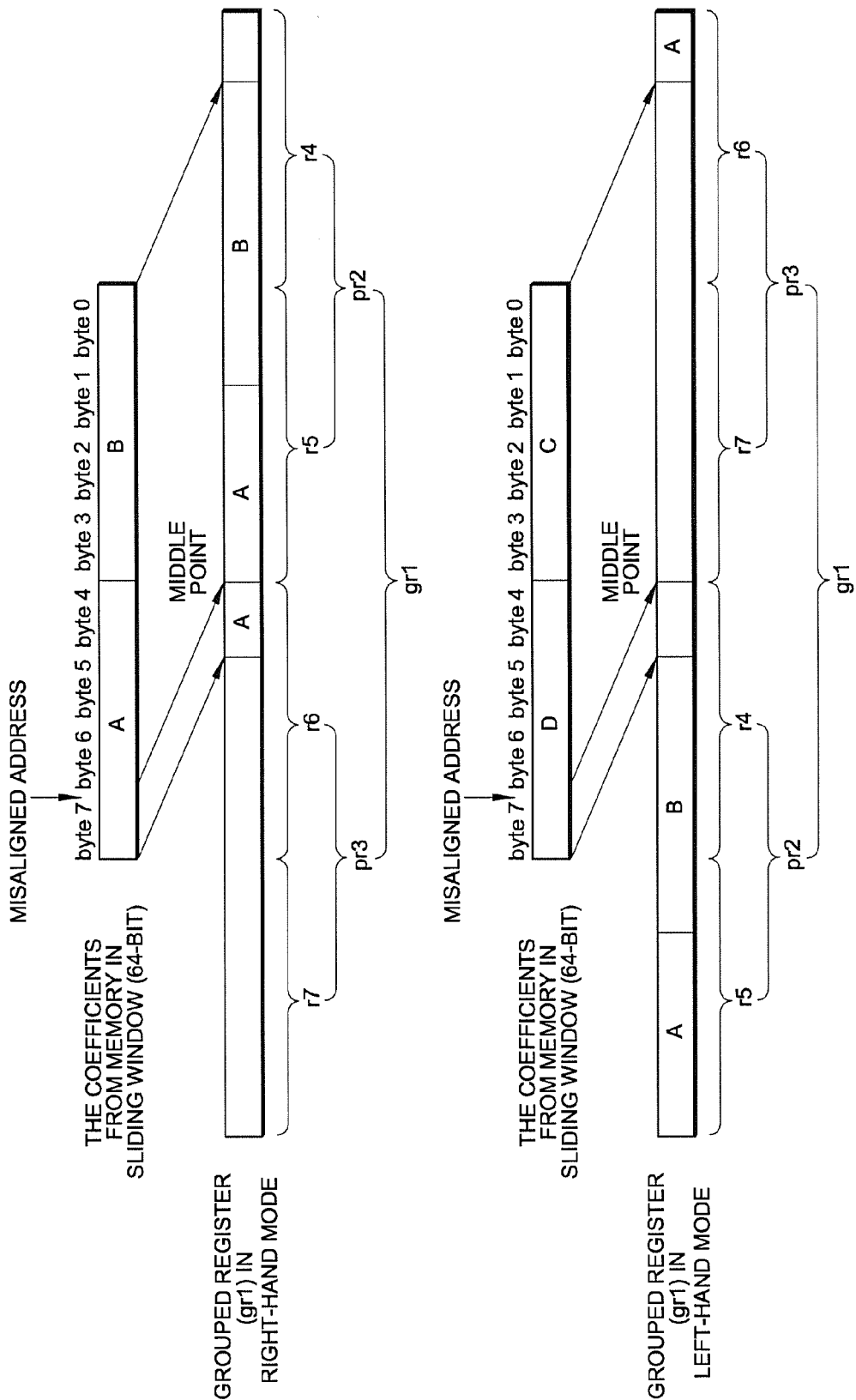
FIG. 10 shows the case of address misalignment in case of correlation operations.
Figure 11:
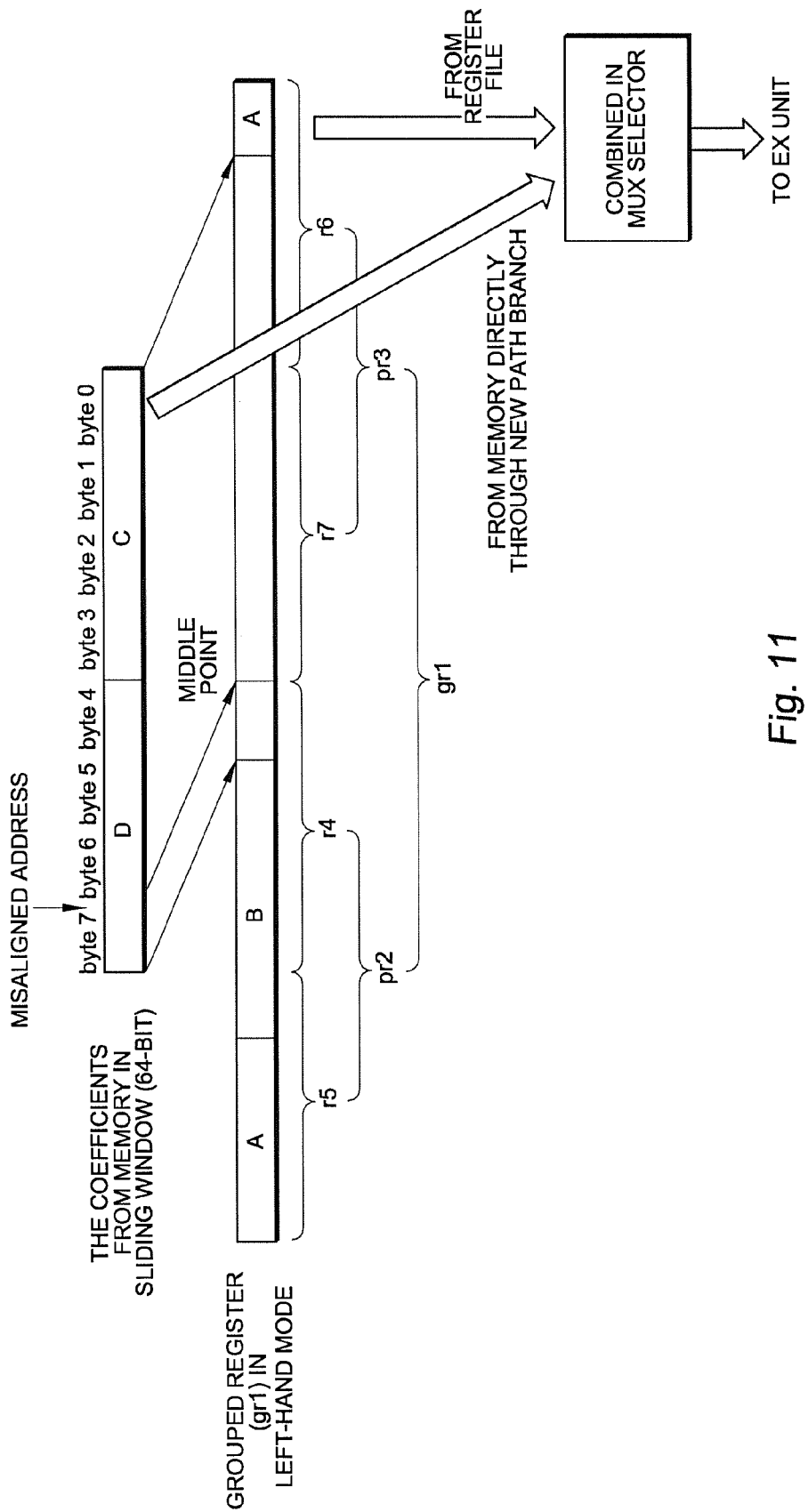
FIG. 11 shows flow of values in the current invention in the case of address misalignment in case of correlation operations.

For correlation applications, the data values and coefficients are both sliding windows. The data values are loaded into one grouped register file by the misaligned value placement method firstly, and then read from the register file into the MAC EX unit for the MAC operations. The coefficients are also loaded into grouped register file by the misaligned value placement method. But besides being loaded into register files, in some special misaligned patterns the coefficients are bypassed to the MAC EX for operation of the current cycle. As is shown in FIG. 10, the coefficients (value A) in register 6 are loaded in the previous cycle, but the misaligned value placement system causes there to be some missed values in register 6. So the MAC operations on the coefficients in register 6 would stall to wait for the missed coefficients; a bubble cycle would be inserted in the pipeline. In order to avoid this, in addition to being saved into register files, the coefficients loaded in the current cycle are bypassed through the new path branch from the AG. The MUX 503 selector combines byte 2 down to byte 0 of memory values with byte 0 of value A in r6. The combined new coefficients are used by the MAC operations in the current cycle. The bubble cycle is omitted and the data-path throughput is balanced again. The overall flow of values is shown in FIG. 11.

In this embodiment, the combination of patterns for which this bypass operation is used are: (1) when the misaligned address caused by the coefficient's sliding window points to byte 7, then byte 2 down to byte 0 of memory value would be combined with byte 0 of r6; (2) when the misaligned address points to byte 6, then byte 1 down to byte 0 of memory coefficients is combined with byte 1 down to byte 0 of r6; and (3) when the misaligned address points to byte 5, then byte 0 memory coefficient is combined with byte 2 down to byte 0 of r6. However, when the misaligned address points to a byte below byte 5, no combination is required. The coefficients of r6 could be used by the MAC operations directly.

For ordinary FIR operations, in which only one window is sliding, the MUX may be configured to function without combining data from the AG. This allows one embodiment of the invention to work as the architecture of FIG. 3.

While the invention has been particularly shown and described with reference to a preferred embodiment thereof, it will be understood by those skilled in the art that various other changes in the form and details may be made without departing from the spirit and scope of the invention.

We claim:

1. An apparatus for performing signal processing operations comprising:
    a memory storage unit;
    an Address Generator (AG) unit functionally connected to the memory storage unit and operable to receive data from, and write data to, the memory storage unit over a data bus that has a plurality of data widths;
    a register file system functionally connected to the AG unit and operable to receive data from, and write data to, the AG unit, and to store data in a register memory array;
    a multiply-accumulate (MAC) execution unit functionally connected to the register file system and operable to receive data from and write data to the register memory array, and which multiplies and adds pairs of data values and writes the sum to a location in the register memory array;
    a multiplexer (MUX) unit functionally connected to the register file system and by a data path to the AG unit and operable to receive data from the register file system, and from the AG unit over the data bus;
    wherein the register file system is organized in a hierarchical scheme for the individual register memory locations, in which pairs of individual register memory locations are organized into paired register (PR) units, and pairs of PR units are organized into group register (GR) units; and
    wherein the AG unit uses a misaligned address placement (MAP) system to place data from the memory storage unit into the register file system by aligning any misaligned address with a middle point of a (GR) unit.

2. The apparatus of claim 1 wherein a plurality of widths of the data bus from the system memory storage unit to the AG unit is a positive power of 2 of a size in bytes of an individual register memory location.

3. The apparatus of claim 1 wherein the AG unit accesses the memory storage unit through a single port.

4. The apparatus of claim 1 wherein the AG unit has one address adder.

5. The apparatus of claim 1 wherein the hierarchical organization scheme organizes eight register locations into two GR units according to either a left-hand mode or a right-hand mode; wherein the left-hand mode arranges registers r0 through r3 into GR0 in the order [r1, r0, r3, r2] and the registers r4 through r7 into GR1 in the order [r5, r4, r7, r6]; and wherein the right-hand mode arranges registers r0 through r4 into GR0 in the order [r3, r2, r1, r0] and the registers r5 through r7 into GR1 in the order [r7, r6, r5, r4].

6. The apparatus of claim 5 wherein the AG unit moves data into the GR units by moving a block of data that is double a size in bytes of a standard register's size in bytes, wherein the AG unit determines an alignment point for the bytes being moved from the memory storage unit, the AG unit aligning said alignment point with the middle point of a GR unit into which the AG unit is to move the data, and the data is correspondingly loaded byte-wise into said GR unit.

7. The apparatus of claim 6 wherein the AG unit moves two blocks of data, each of a size (in bytes) double the standard register's size in bytes, by loading the first block with the GR unit first configured in the left-hand ordering, and the second block of data in the right-hand ordering.

8. The apparatus of claim 6 wherein the AG unit sequentially moves pairs of blocks of data into corresponding GR units, two blocks of data to one GR unit, by determining the appropriate alignment point for each pair of data blocks.

9. The apparatus of claim 6 wherein the MUX unit directly receives data directly from the AG unit, as well as data from the register file system, and loads the values directly into the MAC unit.

10. The apparatus of claim 9 wherein the MUX unit is configured to function without combining data from the AG unit.

11. The apparatus of claim 1 wherein the MAC execution unit is configured for single-instruction, multiple data (SIMD) operation.

12. The apparatus of claim 1 wherein the MAC execution unit is configured for a positive integer K MAC operations per cycle; wherein a size of the data values to be multiplied is a positive power of 2, M; and wherein the data path from the memory storage unit to the register memory array is $2*M*K$.

13. A method for performing processing operations comprising:
    reading, from a memory storage unit, a plurality of values to be used in an operation;
    moving values by an Address Generator (AG) unit from and to register memory locations organized by using both a three-tier hierarchical access scheme and a misaligned address placement (MAP) process;
    moving values from the register memory locations into a multiply-accumulate (MAC) execution unit;
    performing the MAC operation; and writing the result of the operation into register locations;
wherein the three-tier hierarchical access scheme organizes pairs of individual register memory locations into paired register (PR) units, and organizes pairs of PR units into group register (GR) units; and
wherein data is moved from the memory storage unit into the MAC unit by the AG unit through a multiplexing operation without being stored in the register memory locations.

14. The method of claim 13 wherein the plurality of values read from the memory storage unit is moved across a data bus by the AG unit, and wherein the data bus is configured to move double or quadruple data widths in each move.

15. The method of claim 13 wherein the three-tier hierarchical organization scheme organizes eight register locations into two GR units according to either a left-hand mode or a right-hand mode;
wherein the left-hand mode arranges registers r0 through r3 into GR0 in the order [r1, r0, r3, r2] and the registers r4 through r7 into GR1 in the order [r5, r4, r7, r6]; and
wherein the right-hand mode arranges registers r0 through r4 into GR0 in the order [r3, r2, r1, r0] and the registers r5 through r7 into GR1 in the order [r7, r6, r5, r4].

16. The method of claim 13 wherein the AG unit moves data into the GR units by moving a block of data that is double the size in bytes of a standard register's size in bytes, by the AG unit determining an alignment point of the bytes being moved from memory storage unit, the AG unit aligning said alignment point with the middle point of a GR unit into which the AG unit is to move the data, and the data is correspondingly loaded byte-wise into said GR unit.

17. The method of claim 16 wherein the AG unit moves two blocks of data, each of size double the standard register's size, by loading the first block first with the group register configured in the left-hand ordering, and the second block of data in the right-hand ordering.

18. The method of claim 16 wherein the AG unit sequentially moves a plurality of pairs of blocks of data into corresponding GR units, two blocks of data to one GR unit, by determining the appropriate alignment point for each pair of data blocks.

19. The method of claim 13 wherein the MAC execution unit performs single-instruction, multiple data (SIMD) operations.

20. The method of claim 19 wherein the MAC execution unit operates by performing positive integer K SIMD operations per cycle; wherein the size of the data values to be multiplied is a positive power of 2, M; and wherein the data path from the memory storage unit to the register memory array is $2*M*K$.

* * * * *